Sept. 13, 1932.  J. GILTSCH ET AL  1,876,660
VEHICLE BODY CONSTRUCTION
Filed April 16, 1930
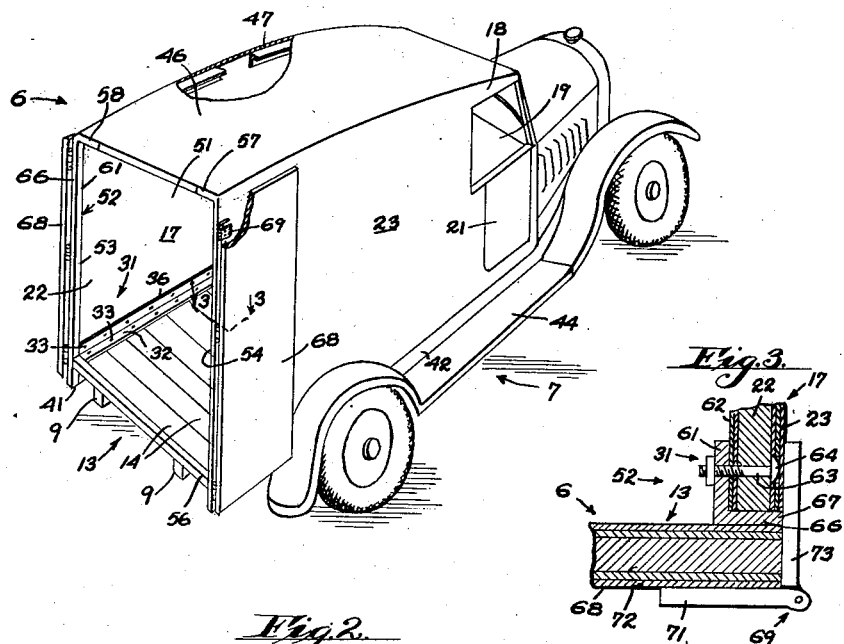
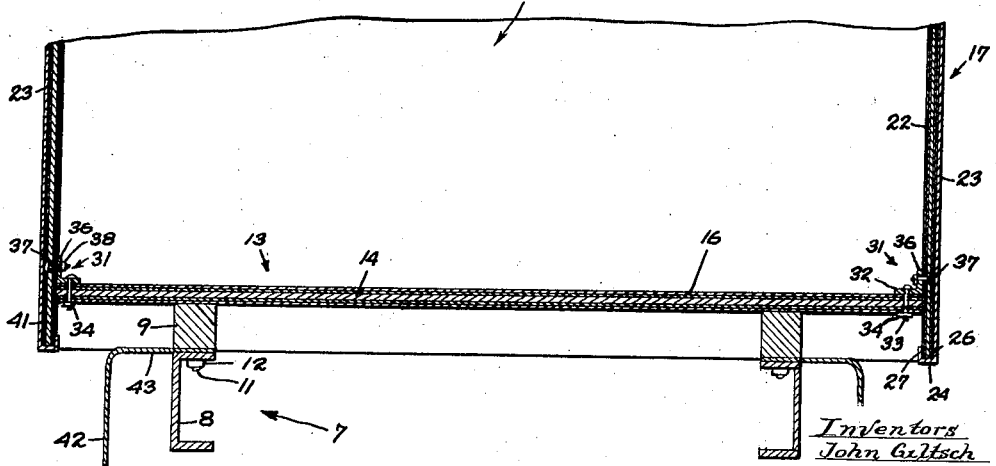
Inventors
John Giltsch
Martin Giltsch
Henry Schorsch
John D. Giltsch.
by Hazard and Miller
Attorney Patented Sept. 13, 1932

1,876,660

UNITED STATES PATENT OFFICE

JOHN GILTSCH, MARTIN GILTSCH, HENRY SCHORSCH, AND JOHN D. GILTSCH, OF LOS ANGELES, CALIFORNIA, ASSIGNORS TO STANDARD CARRIAGE WORKS, INC., OF LOS ANGELES, CALIFORNIA, A CORPORATION OF CALIFORNIA

VEHICLE BODY CONSTRUCTION

Application filed April 16, 1930. Serial No. 444,738.

This invention relates to vehicle bodies, and has for an object the provision of a vehicle body constructed according to a novel design, which imparts as much or greater rigidity to the body as that of which the conventional vehicle bodies are possessed, and yet which is considerably lighter in weight and less expensive to manufacture than vehicle bodies constructed according to conventional design.

Another object is the provision of a vehicle body marked by the absence of projecting elements on the interior surface thereof, with the result that loading and unloading of the body is materially facilitated.

A still further object is to provide a vehicle delivery body construction in which the side panels continue downwards past the plane of the floor, thus providing a skirt adapted to conceal the chassis of the vehicle and the members upon which the floor boards are supported.

A still further object is the provision of a novel type of delivery body for a vehicle, in which the side panels are each of one-piece construction and composed of multi-ply wood, the purpose of which is to produce a body construction less liable to being shattered in the event of collision or overturning of the vehicle upon which the body is installed, than are delivery bodies of conventional design.

Another object is to provide reinforcing means for a delivery body of the general character described, whereby an extreme degree of rigidity is imparted to the body, and racking thereof prevented, even in the presence of severe racking stresses.

The invention possesses other objects and advantageous features, some of which, with those enumerated, will be set forth in the following description of the invention's particular embodiment which is illustrated in the drawing accompanying and forming a part of the specification.

Referring to the drawing:

Figure 1 is a perspective view of an automobile having a delivery body constructed in accordance with the principles of the present invention, operatively installed thereupon. Portions of the figure are broken away and shown in section, to reveal details of construction.

Fig. 2 is a transverse, vertical sectional view taken through the lower portion of the body and the chassis of the automobile.

Fig. 3 is an enlarged detail view in horizontal section. The plane of section may be assumed to have been taken upon the line 3—3 of Fig. 1, but with the door swung to closed position.

The preferred embodiment of the invention comprises a delivery body indicated in its entirety at 6, adapted to be mounted upon the chassis 7 of a conventional automobile. Such a chassis includes longitudinally extending channel-shaped frame members 8; and the vehicle body 6 is secured thereupon, through the expedient of a pair of spaced longitudinal members or risers 9 which are fastened upon the upper flanges of the opposed frame members 8 by means of bolts 11 extending through the longitudinal members 9 and the upper web of each of the channels 8. Each bolt 11 has a nut 12 threaded thereupon, to tighten the transverse members 9 against the channels 8.

The floor 13 of the body 6, comprises transversely extending floor boards 14 laid upon the upper edges of the risers 9, in lateral abutment with each other. The floor boards 14 are rigidly secured to the risers 9 by any suitable fastening means such as wood-screws or the like. In the event that relatively heavy objects are to be carried within the body 6, a sheathing 16 in the form of a metal plate, may be imposed upon the upper faces of the floor boards 14, so as to offer suitable protection thereto.

A side panel 17 extends upwards from each side edge of the floor 13. Each of the panels 17 is of one-piece construction and extends throughout the entire length of the floor 13. In fact, each of the side panels 17, may be extended beyond the forward end of the floor 13 and form the side walls 18 of the cab 19 wherein the driver's compartment is situated, in the event that the vehicle body is to be so equipped. Suitable doors 21 may be provided in these forward extensions 18 of the side panels 17, if desired.

Preferably each of the side panels 17, includes an inner plate 22 of multi-ply wood. We prefer to employ five-ply material for this portion of the body construction, because of the great strength and non-shattering characteristics imparted thereto, by material of this character. The inner plate 22 of each of the side panels 17, is provided on its outer face with a sheathing 23 of sheet metal. The edges 24 of the sheathing 23, are bent around the edges 26 of the plate 22, and gripping flanges 27 formed by bending the extreme edges of the sheathing 23 against the inner face of the plate 22, are adapted to rigidly retain the sheathing 23 in position.

Each of the side panels 17 is rigidly secured at its associated edge of the floor 13, by means of an angle iron 31 which preferably extends throughout the entire length of that edge. One flange 32 of each angle iron 31, is fastened to the floor 13 by a plurality of bolts 33 and nuts 34, whereas the other flange 36 is secured to the associated side panel 17 by a plurality of bolts and nuts 37 and 38 respectively.

Instead of terminating in the plane of the floor 13, the lower edges of the side panels 17, continue downwards therepast preferably in the planes of their respective panels. In this manner, skirts 41 are provided which are adapted to conceal the risers 9 as well as the chassis 7, from the view of persons viewing the vehicle under normal circumstances. As will readily be appreciated, the presence of these skirts 41 results in an unusually neat appearing vehicle body wherein none of the underneath structure of the flooring nor the chassis 7 of the vehicle, can be seen. Preferably kick plates 42 are secured at their upper edges 43 between the transverse members 9 and the channels 8, these kick plates 42 extending downwards to the running-boards 44.

The roof 46 of the body 6, extends between the upper edges of the opposed side panels 17, to each of which it is rigidly secured through the expedient of angle irons 47. Preferably the means for fastening the angle irons 47, are similar to those used in conjunction with the angle irons 31.

The floor 13, the side panels 17, and the roof 46, of the vehicle body, preferably all terminate in alignment with each other at the after end of the body defining a large opening 51 through which access to the interior of the vehicle body may be had as when loading or unloading. A reinforcing angle iron 52 encircles this opening 51, and is composed of vertical sections 53 and 54 secured to the after ends of side panels 17, a horizontal section 56 secured to the after end of the floor 13, and opposed short sections 57 and 58 secured to the after end of the roof 46 adjacent the sides thereof. These sections of the angle iron 52, are preferably welded together so as to yield an integral marginal angle iron capable of imparting the greatest possible degree of rigidity to the body, so as to effectually prevent racking thereof, even in the presence of severe racking stresses. Fig. 3 shows the preferred method of applying the angle iron 52. One leg 61 of the angle iron is attached to the inner face 62 of the associated member of the body construction—the member selected for the showing in Fig. 3 being one of the side panels 17; a plurality of bolts 63 or their equivalent being employed for this purpose. Preferably the heads 64 of the bolts 63, are countersunk within the inner plate 22, so that the heads may be concealed underneath the sheathing 23. The other leg 66 of the angle iron 52, extends across the after end of the associated panel, preferably with the extreme outer edge 67 of that leg 66, lying in alignment with the outer face of the sheathing 23.

A pair of opposed doors 68 are hung so as to provide means for closing the opening 51, as by hinges 69. We prefer to hang the doors 68 by securing one leaf 71 of each hinge 69, against the outer face 72 of the associated door 68, and the other leaf 73 of each hinge, to the outer face of the sheathing 23 of one of the side panels 17, as clearly shown upon Fig. 3. This method of hanging the doors 68, permits them to be swung through 270° from closed position, so that when fully opened, they lie against the outer faces of the side panels, thus permitting unrestricted access to the open, after end of the vehicle body.

Constructing the vehicle body 6 in this manner, results in making it possible to dispense with all struts, corner posts and other elements which, in vehicle bodies of conventional design, project from the interior surface thereof, and hence cause a considerable amount of difficulty in loading and unloading articles to and from the body, respectively. The construction of the side panels 17 of multi-ply wood sheathed on their outer faces, and the strengthening of the body by means of the marginal angle iron 52, yields fully as rigid a body construction as those in which the struts and corner posts are employed, and furthermore, produces a structure which is much less liable of being shattered when in collision, or otherwise subjected to heavy strains. We have found in actual practice, that a vehicle body constructed in accordance with the hereinabove description, is capable of withstanding far greater shocks than the well-known type of vehicle body, and with relatively little damage thereto, with respect to either its inherent strength or its appearance.

It is to be understood that the details of the invention as herein disclosed, are subject to alteration within the spirit or scope of the appended claim.

We claim:

In a vehicle body construction a floor, means for securing said floor to a chassis, a one-piece side panel secured at each side edge of said floor and extending upwards therefrom, a roof extending between the upper edges of said side panels, and an integral angle iron rigidly secured to the after edges of said floor, said roof and said side panels, one leg of said angle iron being secured against the inner faces of said roof, said side panels and said floor adjacent the after edges thereof, and the other leg of said angle iron extending across said after edges.

In testimony whereof we have signed our names to this specification.

JOHN GILTSCH.
MARTIN GILTSCH.
HENRY SCHORSCH.
JOHN D. GILTSCH.